(12) United States Patent
Bordignon et al.

(10) Patent No.: US 9,858,311 B2
(45) Date of Patent: Jan. 2, 2018

(54) HETEROSCEDASTIC DATA COMPRESSION USING ARIMA-GARCH MODEL ESTIMATION

(71) Applicant: EMC IP Holding Company LLC, Hopkinton, MA (US)

(72) Inventors: Alex L. Bordignon, Rio de Janeiro (BR); Angelo E. M. Ciarlini, Rio de Janeiro (BR); Timothy A. Voyt, Rio de Janeiro (BR); Silvana Rossetto, Rio de Janeiro (BR); Renato M. M. Medeiros, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 937 days.

(21) Appl. No.: 14/230,510

(22) Filed: Mar. 31, 2014

(65) Prior Publication Data
US 2015/0278284 A1    Oct. 1, 2015

(51) Int. Cl.
*G06F 17/30*    (2006.01)
*G06F 7/00*    (2006.01)

(52) U.S. Cl.
CPC .. *G06F 17/30371* (2013.01); *G06F 17/30306* (2013.01); *G06F 17/30312* (2013.01)

(58) Field of Classification Search
CPC ......... G06F 17/30371; G06F 17/30312; G06F 17/30306
USPC .................................................... 707/693
See application file for complete search history.

(56) References Cited

U.S. PATENT DOCUMENTS

| | | | | |
|---|---|---|---|---|
| 2013/0018889 A1* | 1/2013 | Jagmohan | ........... | H03M 7/3084 |
| | | | | 707/741 |
| 2014/0200953 A1* | 7/2014 | Mun | ..................... | G06Q 10/04 |
| | | | | 705/7.28 |
| 2015/0073612 A1* | 3/2015 | Ireland | ................ | H04L 12/2816 |
| | | | | 700/295 |

OTHER PUBLICATIONS

Bollerslev, Tim, "Generalized Autoregressive Conditional Heteroskedasticity", Journal of Econometrics, 31 (3): 307-327.
Joseph George Caldwell, PhD., "The Box-Jenkins Forecasting Technique," Jan. 1971.
Bera et al., "ARCH models: properties, estimation and testing" Journal of economic surveys 7, No. 4 (1993): 305-637.

(Continued)

*Primary Examiner* — Kuen Lu
(74) *Attorney, Agent, or Firm* — Ryan, Mason & Lewis, LLP (57) ABSTRACT

Methods and apparatus are provided for compression and decompression of heteroscedastic data, such as seismic data, using Autoregressive Integrated Moving Average (ARIMA)-Generalized Autoregressive Conditional Heteroscedasticity (GARCH) model estimation. Heteroscedastic data is compressed by obtaining the heteroscedastic data; applying the heteroscedastic data to an ARIMA-GARCH model; determining residuals between the obtained heteroscedastic data and the ARIMA-GARCH model; and compressing parameters of the ARIMA-GARCH model and the residuals using entropy encoding, such as an arithmetic encoding, to generate compressed residual data. Parameters of the ARIMA-GARCH model are adapted to fit the obtained heteroscedastic data. The compressed residual data is decompressed by performing an entropy decoding and obtaining the parameters of the ARIMA-GARCH model and the residuals. The ARIMA-GARCH model predicts heteroscedastic data values and then the decompressed residuals are added.

21 Claims, 7 Drawing Sheets

(56) References Cited

OTHER PUBLICATIONS

Francq et al., "Maximum likelihood estimation of pure GARCH and ARMA-GARCH processes" Bernoulli 10.4 (2004): 605-637.
Stearns, Damuel D., "Arithmetic coding in lossless waveform compression" Signal Processing, IEEE Transactions on 43.8 (1995): 1874-1879.

* cited by examiner

HETEROSCEDASTIC DATA COMPRESSION USING ARIMA-GARCH MODEL ESTIMATION

FIELD

The field relates generally to data compression of signal data, such as seismic data.

BACKGROUND

Oil must increasingly be extracted from more complex geologies, thereby driving the demand for better sensor acquisition technologies, higher resolution hydrocarbon models, more iterations of analysis cycles, and increased integration of a broader variety of data types. As a result, the size of seismic datasets continues to increase. In addition, four-dimensional modeling techniques have been developed to monitor and simulate reservoirs over time, based on the acquisition of seismic data from a same area at different points in time. Thus, seismic data compression has become crucial in geophysical applications, for efficient processing, storage and transmission. A need therefore exists for improved techniques for compressing both raw and processed seismic data.

Seismic data is a special kind of time series of signal data. Signal data compression techniques typically work in two phases. In a first phase, data is represented by a function that estimates values and residuals obtained from the difference between the original and the estimated values. In a second phase, the residuals and the function parameters are entropy encoded. The final result heavily depends on how well a function can be found that accurately estimates the values so that the residuals are small. The main challenge for seismic data is the fact that it is not an easy task to find such a function due to the nature of the data.

SUMMARY

Illustrative embodiments of the present invention provide methods and apparatus for compression and decompression of heteroscedastic data, such as seismic data, using Autoregressive Integrated Moving Average (ARIMA)-Generalized Autoregressive Conditional Heteroscedasticity (GARCH) model estimation. In one exemplary embodiment, heteroscedastic data is compressed by obtaining the heteroscedastic data; applying the heteroscedastic data to an ARIMA-GARCH model; determining residuals between the obtained heteroscedastic data and the ARIMA-GARCH model; and compressing parameters of the ARIMA-GARCH model and the residuals using entropy encoding, such as an arithmetic encoding, to generate compressed residual data. Generally, the ARIMA-GARCH model models a time series taking into account both the previous values and the variance, obtaining coefficients that reduce the variance of the residuals.

According to one aspect of the invention, one or more parameters of the ARIMA-GARCH model are adapted to fit the obtained heteroscedastic data. A number of terms for an ARIMA portion of the model is based on previous values having an autocorrelation above a certain threshold and a number of terms for a GARCH portion of the model is based on determining whether a number of components fits the variance. In one exemplary embodiment, the parameters of the ARIMA-GARCH model are adpated using only a subset of the obtained heteroscedastic data.

According to another aspect of the invention, the compressed residual data is decompressed by performing an entropy decoding and obtaining the parameters of the ARIMA-GARCH model and the residuals, and applying the ARIMA-GARCH model created during the compression to predict heteroscedastic data values and then the decompressed residuals are added. The obtained heteroscedastic data is optionally partitioned and a ARIMA-GARCH model can be created for each partition. The ARIMA-GARCH model can optionally be generated in advance and obtained from storage for application to the heteroscedastic data.

Advantageously, illustrative embodiments of the invention provide improved compression of seismic data. These and other features and advantages of the present invention will become more readily apparent from the accompanying drawings and the following detailed description.

DETAILED DESCRIPTION

Illustrative embodiments of the present invention will be described herein with reference to exemplary communication, storage and processing devices. It is to be appreciated, however, that the invention is not restricted to use with the particular illustrative configurations shown. Aspects of the invention provide methods and apparatus for compression of heteroscedastic data, such as seismic data, using ARIMA-GARCH model estimation. While the exemplary embodiment is described herein using seismic data, aspects of the present invention can be applied to other forms of heteroscedastic data, as would be apparent to a person of ordinary skill in the art based on the present disclosure.

In one exemplary embodiment, improved techniques are provided for lossless compression of seismic data. The exemplary technique consists of two main stages. A first stage executes a modified linear prediction with floating point coefficients. The prediction is based on the last inputs of the data. It is assumed that the seismic data to be compressed can be modeled as a heteroscedastic time series and the data is represented based on the coefficients of the prediction model and the residual differences between each value and its corresponding prediction. One aspect of the invention models the time series using time-series stochastic models to find the coefficients that minimize the variance of the residuals. Aspects of the present invention recognize that if the variance of the residuals is small, it is possible to represent them using fewer bits, which results in a better compression. In the second stage of the compression process, the model parameters and sequence of residuals are encoded using the entropy encoding technique of arithmetic encoding.

Aspects of the present invention recognize that seismic data has a heteroscedastic nature because it exhibits clusters of signal variance. The clusters of signal variance are attributed to the earth's crust being composed of multiple layers of materials with heterogeneous impedances. One aspect of the present invention applies the Autoregressive Integrated Moving Average (ARIMA) model in conjunction with the Generalized Autoregressive Conditional Heteroscedasticity (GARCH) model to fit the seismic data, which reduces the residual entropy. For a discussion of ARIMA and GARCH models, see, for example, George E P Box et al., "Time Series Analysis: Forecasting and Control," (Wiley, 2013) and Tim Bollerslev, "Generalized Autoregressive Conditional Heteroscedasticity," Journal of Econometrics, 31(3), 307-327 (1986), respectively, incorporated by reference herein. These models have been used, for example, in the financial trading market and Econometrics for risk forecasting. After reducing the data entropy in the first stage, arithmetic encoding is applied in the second phase to compress both the parameters used to predict values and the residuals of the data.

Seismic Data

Oil and gas companies typically acquire and process seismic data from a given prospect area before drilling a well in the area. Seismic acquisition comprises creating acoustic waves using a source, such as a vibrator unit, dynamite shot, or an air gun, and then collecting data related to the reflected waves. The signals are collected by means of receivers referred to as geophones (when the acquisition occurs onshore) or hydrophones (when the acquisition occurs offshore). The receivers convert acoustic vibrations into streams of digital samples having in general a number of bits from 8 to 32 bits. Samples are continuously collected at intervals that have a constant duration (typically between 2 and 8 milliseconds) and data is typically collected by many receivers simultaneously. Seismic datasets can have many terabytes of raw data and their processing generates other additional datasets at various points throughout the seismic processing steps.

In spite of the fact that lossy compression algorithms are able to reach much higher compression ratio, lossless compression is necessary in the various steps of seismic processing. The original data has to be preserved with the original precision in order to avoid losing relevant information. In particular, complicated geologies, such as in pre-salt areas, have a very low signal-to-noise ratio, which makes the preservation of high data frequencies even more important. Therefore, it is often important to ensure that the employed compression methods are lossless.

Seismic processing workflows typically correspond to various steps that modify the raw data, creating new seismic data files at each step. Depending on the phase and processing techniques utilized, the size of the resulting file can be as large as the original file. Discovering ways to reduce the size occupied by these large data files and store them efficiently is a problem that needs to be addressed.

Oil and gas companies are often global companies and the interpretation of seismic data is a process in which Geophysicists and Geologists have to collaborate over distance. The efficient transmission of the seismic data is essential to make this process productive. A good compression ratio is important to save time during the transmission, in particular when it is necessary to send data with limited bandwidth and without any information loss.

More recently, seismic mega-surveys of processed data have been created to merge the results of processing various seismic acquisitions in the same area. As the result of new seismic processing might be necessary to update a mega-survey, it might be necessary to store different versions of a same mega-survey that have many parts in common. In this scenario, data deduplication tends to play an important role to save memory storage for backing up various similar files.

Deduplication of previously compressed data usually does not obtain good results because the compression process might eliminate the possibility of identifying copies of parts of the data. In order to obtain a good result, compression should be applied to data that is already deduplicated, which demands the ability to compress and decompress chunks of deduplicated data independently from the rest of the file.

Seismic Data Compression Using ARIMA-GARCH Model Estimation

Figure 1:
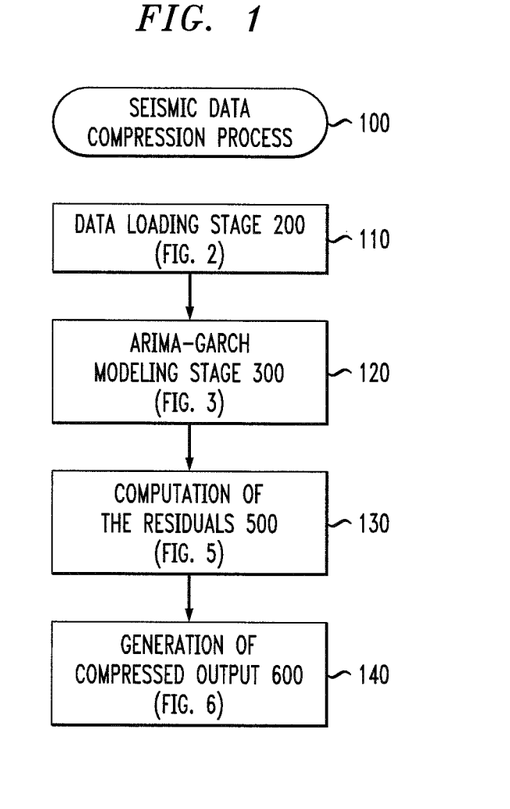
FIG. 1 is a flow chart of an exemplary seismic data compression process incorporating aspects of the present invention.

FIG. 1 is a flow chart of an exemplary seismic data compression process 100 incorporating aspects of the present invention. As shown in FIG. 1, the exemplary seismic data compression process 100 initially performs a data loading stage 200 during step 110, as discussed further below in conjunction with FIG. 2.

The seismic data that is loaded during step 110 is applied to an ARIMA-GARCH modeling stage 300 during step 120, as discussed further below in conjunction with FIG. 3. Based on the ARIMA-GARCH model and the original data loaded in step 110, the seismic data compression process 100 builds a series of residuals $\epsilon_i$ 500 during step 130, as discussed further below in conjunction with FIG. 5. Finally, during step 140, the seismic data compression process 100 compresses the parameters of the ARIMA-GARCH model generated by an ARIMA-GARCH model adjustment process 400, as discussed further below in conjunction with FIG. 4, and the residuals 500 generated during step 130, using entropy encoding to generate compressed output 600, as discussed further below in conjunction with FIG. 6.

Data Loading

Figure 2:
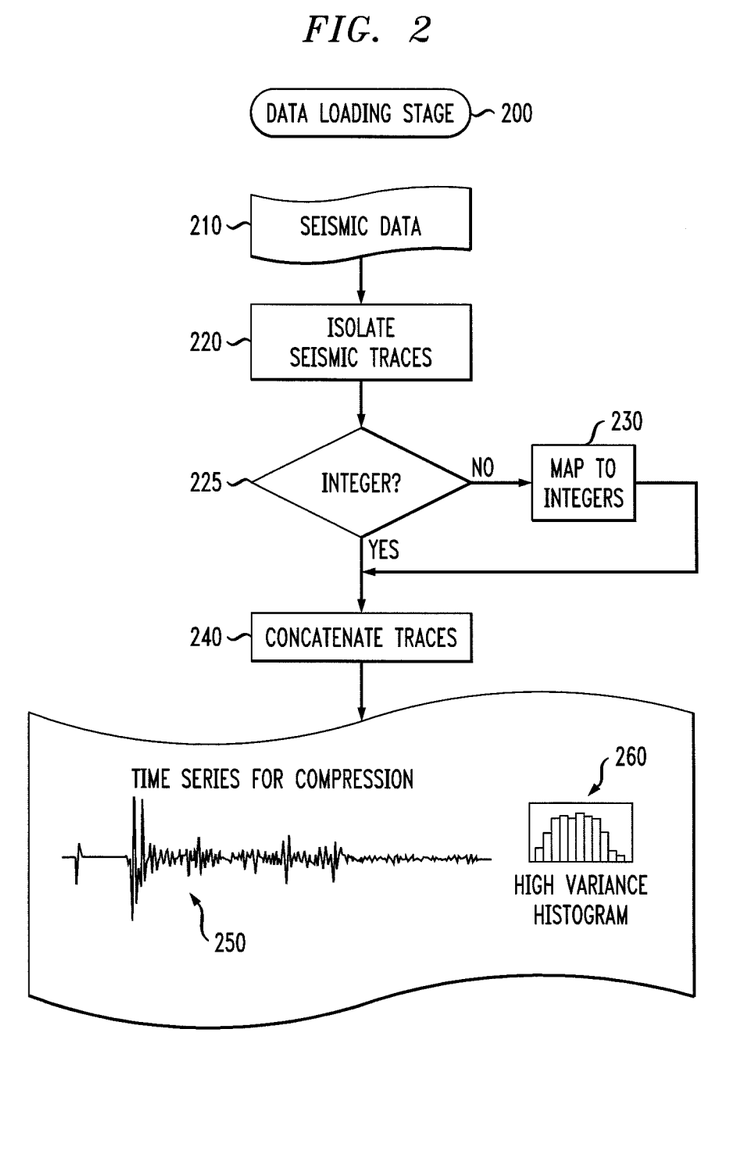
FIG. 2 illustrates the data loading stage of FIG. 1 in further detail.

FIG. 2 illustrates the data loading stage 200 of FIG. 1 in further detail. As shown in FIG. 2, the seismic data 210 to be compressed is progressively loaded into memory. The seismic traces are usually stored together with headers. In this way, step 220 is executed to isolate the traces from the headers. Generally, the traces of the seismic data 210 correspond to sequences of signal samples collected by sensors, which are represented by a fixed number of bits that might vary from, for example, 8 bits to 32 bits. It is assumed that the exemplary samples are represented by integer numbers. The sequence of samples are denoted by $X_{i=1\ldots n}$, where n is the number of samples.

A test is performed during step 225 to determine if seismic data is directly represented as integers. When seismic data is directly represented as integers, the seismic data compression process 100 can be directly applied. In the oil and gas industry, however, seismic data is usually stored as seismic traces using one of several standards developed by the Society of Exploration Geophysicists (SEG) for storing seismic data. The most commonly used format is SEG Y. Within SEG Y files, a seismic trace is represented by a sequence of 32-bit floating-point numbers. To work with this type of data without losing any information, special care is necessary. The floating-point numbers are mapped to integers in step 230, taking into account that precision must be maintained and that the operation has to be reversible, in the exemplary embodiment. In addition, the exemplary transformation must preserve properties of the data that can have an impact on the compression, such as the order and scale of the numbers. In the exemplary embodiment, this is done by aligning the mantissas of the values to be compressed and keeping track of the alignment shift as meta-data (i.e., the mantissas are shifted to the right or to the left, so that they represent values with the same exponent). In this way, the floating-point numbers are mapped to integers that contain their mantissas after the alignment.

As further shown in FIG. 2, traces are concatenated in step 240 to create a single time series 250 ready to be compressed, which exhibits a high variance histogram 260.

ARIMA-GARCH Model Estimation

Figure 3:
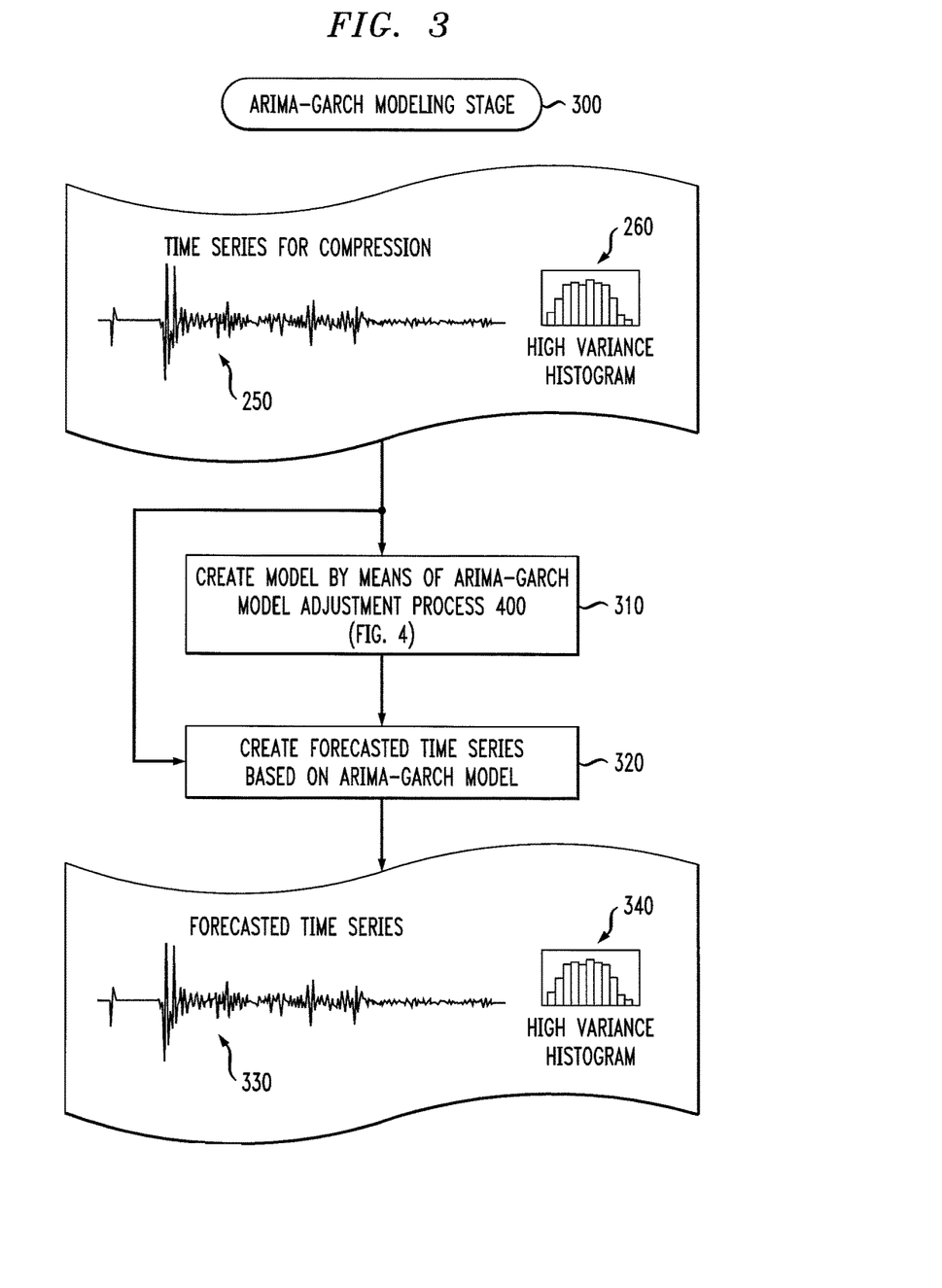
FIG. 3 illustrates the creation and application of the ARIMA-GARCH model of FIG. 1 in further detail.

FIG. 3 illustrates the ARIMA-GARCH modeling stage 300 of FIG. 1 in further detail. This stage creates a prediction model to fit the time series 250 ready for compression. Step 310 creates the ARIMA-GARCH model, as discussed further below in conjunction with FIG. 4, which predicts the future values of the time series based on the original past values and the previous prediction errors (the difference between predicted values and original values). Using the generated model, step 320 creates a forecasted time series 330, which also presents a high variance histogram 340, as it tries to fit the original time series 250.

Generally, ARIMA is a model of the theory of temporal series. ARIMA can be used to predict the next values of a temporal series based on its last previous values. ARIMA can be seen as an extension of an ARMA (Autoregressive Moving Average) model that considers the effects of trends by means of differentiating the original time series. An ARIMA model has three components, (p, d, q), where p is the number of autoregressive terms, d is the number of differentiations of the time series that should be considered and q establishes the order of a moving average. For instance, an ARIMA model (p, d, q) for a series $Z_{i=1, 2, \ldots}$ has the following format:

$$W_i = \Delta^d Z_i$$

$$W_i = \rho_1 W_{i-1} + \rho_2 W_{i-2} + \ldots + \rho_p W_{i-p} + a_i + \theta_1 a_{i-1} + \theta_2 a_{i-2} + \ldots + \theta_q a_{i-q}$$

where $\Delta$ is the operator for differentiation of the time series, and $\theta_{j=1, 2, \ldots, q}$ and $\rho_{j=1, 2, \ldots, p}$ are coefficients. In this manner, $W_{i=1, 2, \ldots}$ is the differentiation of $Z_{i=1, 2, \ldots}$ d times. The ARIMA model says that the value of time series $W_{i=1, 2, \ldots}$ at a point i in time can be predicted based on the p previous values of $W_{i=1, 2, \ldots}$ and on the q previous residuals obtained from series $Z_{i=1, 2, \ldots}$ (i.e., the differences between the predicted values and their observed values, which form the series $a_{i=1, 2, \ldots}$). In general, it is assumed that $a_i$ is a Gaussian white noise (i.e., serially uncorrelated random variables that have a Gaussian distribution, zero mean value and finite variance).

This equation can be rewritten in the following way:

$$W_i - \rho_1 W_{i-1} - \rho_2 W_{i-2} - \ldots - \rho_{i-p} W_{i-p} = a_i + \theta_1 a_{i-1} + \theta_2 a_{i-2} + \ldots + \theta_q a_{i-q}$$

The autoregressive operator $\overline{AR}_p$ specifies an auto regression of the last p values from a series and the moving average operator $\overline{MA}_q$ specifies moving averages of order q. The equation can then be rewritten, as follows:

$$\overline{AR}_p(W_i) = \overline{MA}_q(a_i) \Leftrightarrow \overline{AR}_p(\Delta^d Z_i) = \overline{MA}_q(a_i)$$

Noticing that the terms of $\Delta^d Z_{i=1, \ldots, p}$ are differences between terms of $Z_{i=1, 2, \ldots, p+d}$, the model can be represented by:

$$\overline{AR}_{p+d}(Z_i) = \overline{MA}_q(a_i)$$

The terms of $Z_{i=1, 2, \ldots}$ can then be obtained by means of the following formula:

$$Z_i + \varphi_1 Z_{i-1} + \varphi_2 Z_{i-2} + \ldots + \varphi_{p+d} Z_{i-p+d} + a_i + \theta_1 a_{i-1} + \theta_2 a_{i-2} + \ldots + \theta_q a_{i-q}$$

To predict values using the ARIMA model (p, d, q), the p+d parameters $\theta_{j=1, 2, \ldots, p+d}$, the last p+d samples of the series $Z_{j=i-(p+d), \ldots, i-2, i-1}$, the q parameters $\theta_{j=1, 2, \ldots, q}$ and the last q residuals $a_{j=i-1, i-2, \ldots, i-q}$ are needed.

As the data series is heteroscedastic, a better fitting of the model can be obtained by using a GARCH variance model to estimate the series of residuals $a_i$. A GARCH variance model is able to predict the variance of a temporal series using the last values of the series. This model has two components ($\overline{p}, \overline{q}$): $\overline{p}$ corresponds to the number of GARCH terms and $\overline{q}$ corresponds to the number of ARCH terms. See, for example, Anil K. Bera and Matthew L. Higgins, "ARCH Models: Properties, Estimation and Testing," Journal of Economic Surveys, Vol. 7, No. 4, Bera, 305-366 (1993), incorporated by reference herein.

A GARCH model ($\overline{p}, \overline{q}$) for the time series $\delta_i$ has the following format:

$$\delta_i = \eta_i \sqrt{h_i},$$

$$h_{i+1} = \overline{\alpha}_0 \delta_i^2 + \overline{\alpha}_0 \delta_{i-1}^2 + \ldots + \overline{\alpha}_{(\overline{q}-1)} \delta_{i-(\overline{q}-1)}^2 + \overline{\beta}_0 h_{i-1} + \ldots + \overline{\beta}_{\overline{q}-1} h_{i-(\overline{q}-1)} + \overline{\gamma}.$$

where $\overline{\alpha}_{j=0, 1, \ldots, \overline{p}}$, $\overline{\beta}_{j=0, 1, \ldots, \overline{q}}$ and $\overline{\gamma}$ are the parameters of the GARCH model, $\eta_i$ is, in general, a Gaussian process with constant variance and zero mean, and $\delta_i$ is a data series with zero mean.

It is possible to combine the two models in order to create the ARIMA-GARCH model, i.e., an ARIMA with GARCH variance. A model ARIMA(p, d, q)-GARCH($\overline{p}, \overline{q}$) can be written in the following way (in which residuals $a_i$ are modeled by the GARCH model):

$$Z_i = \varphi_1 Z_{i-1} + \varphi_2 Z_{i-2} + \ldots + \varphi_{p+d} Z_{i-p+d} + \alpha_i + \theta_1 \alpha_{i-1} + \theta_2 \alpha_{i-2} + \ldots + \theta_q \alpha_{i-q},$$

$$\alpha_i = \epsilon_i \sqrt{h_i},$$

$$h_{i+1} = \overline{\alpha}_0 \alpha_i^2 + \overline{\alpha}_0 \alpha_{i-1}^2 + \ldots + \overline{\alpha}_{(\overline{p}-1)} \alpha_{i-(\overline{p}-1)}^2 + \overline{\beta}_0 h_i + \overline{\beta}_1 h_{i-1} + \overline{\beta}_{(\overline{q}-1)} h_{i-(\overline{q}-1)} + \overline{\gamma}$$

This model contains the parameters $\varphi_{j=1, 2, \ldots, p+d}$, $\theta_{j=1, 2, \ldots, q}, \overline{\alpha}_{j=0, 1, \ldots, (\overline{p}-1)}, \overline{\beta}_{j=0, 1, \ldots, (\overline{q}-1)}$ and $\overline{\gamma}$. An optimization problem is solved of estimating the best values of these parameters that generate the lowest variance for the residuals. The gradient descent method is applied to solve this problem.

By knowing the values of the ARIMA parameters $(\varphi_{j=1, 2, \ldots, p+d}, \theta_{j=1, 2, \ldots, q})$ and the last p+d samples of the data series $Z_{i=n-(p+d), \ldots, n-2, n-1, n}$, the value of the next element can be predicted. Since a GARCH variance model was considered, the series of residuals tends to have low variance.

Figure 4:
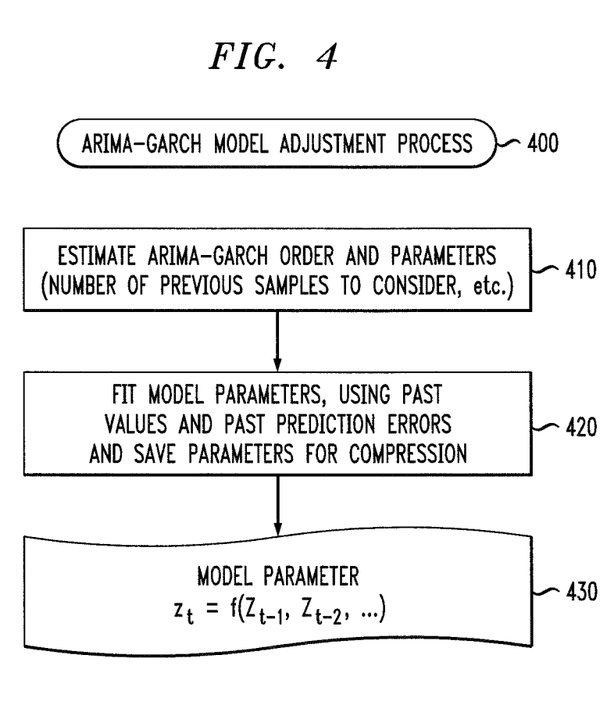
FIG. 4 illustrates an exemplary ARIMA-GARCH model adjustment process.

FIG. 4 illustrates an exemplary ARIMA-GARCH model adjustment process 400. Generally, the ARIMA-GARCH model adjustment process 400 adjusts the ARIMA-GARCH model so that it can fit seismic data series $X_i$. As shown in FIG. 4, the ARIMA-GARCH model adjustment process 400 initially estimates the number of parameters of each model during step 410. For the ARIMA terms, the autocorrelation of $X_i$ is analyzed and the number of terms is chosen based on the idea of considering all previous values that still have an autocorrelation above a certain threshold. For the GARCH terms, $\overline{p}=1, \overline{q}=1$ is initially established and whether the number of components is sufficient to fit the variance is analyzed. When it is not the case, the number of components is incremented to fit a more complex data series.

The ARIMA-GARCH model adjustment process 400 then estimates the best values for the parameters of the models during step 420 using past values and past prediction errors, generating the model parameters 430, which are used to build the forecasted time series 330. In order to estimate the best values for the parameters, a subset $\overline{X}_i \subset X_i$ is chosen and a likelihood function $\mathcal{L}(\overline{X}_i, \theta)$ is built, which measures how well an ARIMA-GARCH model (with values $\theta$ for the parameters) fits $\overline{X}_i$. The function $\mathcal{L}(\overline{X}_i, \theta)$ is built, for example, as described in Christian Francq and Jean-Michel Zakoian, "Maximum Likelihood Estimation of Pure GARCH and ARMA-GARCH Processes," Bernoulli, 10.4, 605-637 (2004), incorporated by reference herein.

It can be shown that the point of maximum value for a likelihood function is the one that minimizes the variance of the residuals. This is fundamental to obtain residuals that can be represented with fewer bits.

Residual Generation

As noted above, the ARIMA-GARCH model that predicts values of the seismic data series is applied during step 120 of the seismic data compression process 100. Based on the model and the original data, a series of residuals $\epsilon_i$ is built by the seismic data compression process 100 during step 130. To build the residuals $\epsilon_i$, the difference between each original value and its corresponding predicted value is calculated. As the ARIMA-GARCH was created based on the same data that is being compressed (or a portion of it), the sequence of residuals has very low variance and can be represented by few bits. Using the residuals and the parameters of the model, it is possible to recover the original data. In this way, this is the only information that needs to be stored.

Figure 5:
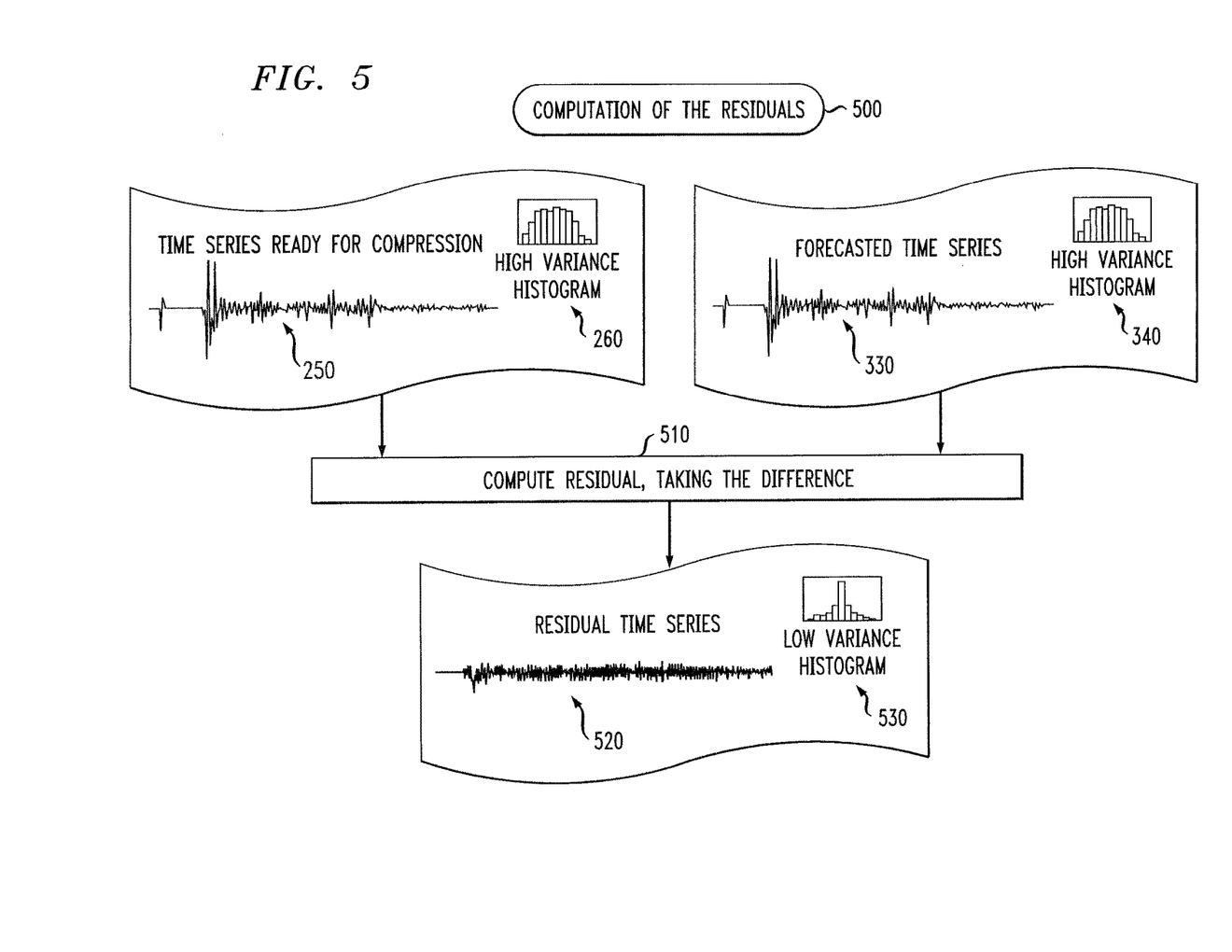
FIG. 5 illustrates the generation of the residuals $\epsilon_i$ of FIG. 1 in further detail.

FIG. 5 illustrates the computation of the residuals process 500 of FIG. 1 in further detail. The series of residuals $\epsilon_i$ computed during step 510 represent the difference between each original value and its corresponding predicted value. As shown in FIG. 5, the residual time series 520 exhibits low variance histogram 530, relative to the histograms of the original time series 250 and the forecasted time series 330.

Entropy Coding

Figure 6:
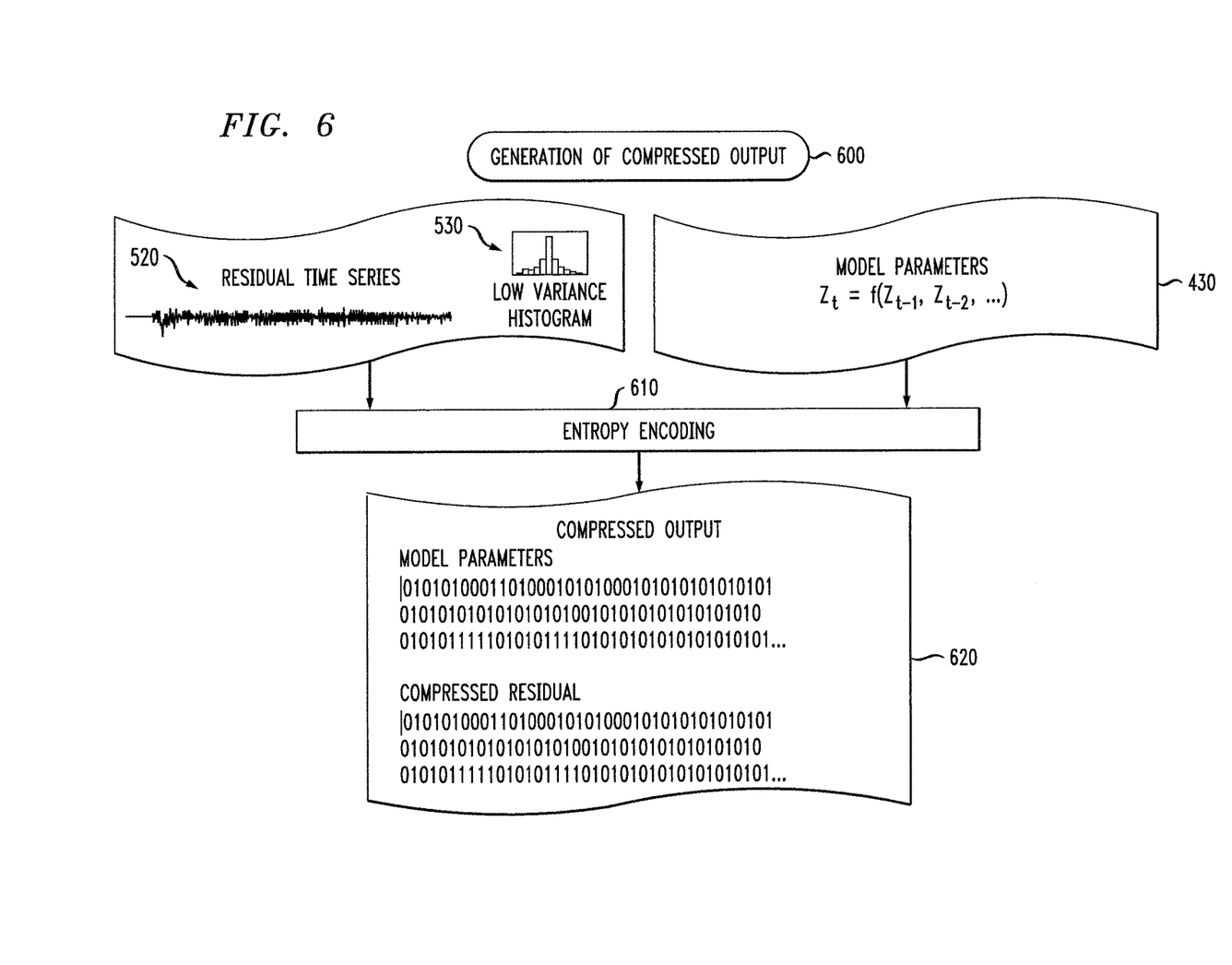
FIG. 6 illustrates how the compressed output is composed by the seismic data compression process 100 of FIG. 1 in further detail.

FIG. 6 illustrates in further detail the generation of the compressed output 600, which corresponds to step 140 of the seismic data compression process 100 of FIG. 1. As noted above, the model parameters 430 of the ARIMA-GARCH model generated by the ARIMA-GARCH model adjustment process 400 and the residuals 520 generated during step 130 are compressed during step 610 using entropy encoding to obtain an even higher compression ratio. In the exemplary embodiment, the compression step employs arithmetic coding, as described in Samuel D. Stearns, "Arithmetic Coding in Lossless Waveform Compression," IEEE Transactions on Signal Processing, 43.8, 1874-1879 (1995), incorporated by reference herein.

The compressed output 620 comprising compressed model parameters and compressed residuals can be decompressed by implementing the exemplary seismic data compression process 100 of FIG. 1 in the opposite direction, without solving any optimization problem. After reversing the arithmetic coding (step 140) and obtaining the parameters and residuals, the model created during the compression is applied to predict values and then the residuals are added. Therefore, the computation to decompress the signal is lightweight.

Among other benefits, the disclosed exemplary seismic data compression process 100 provides a data compression method for seismic data that is lossless while achieving high compression ratios. The adjusted ARIMA-GARCH model is able to predict the next sample. Thus, the disclosed exemplary seismic data compression process 100 calculates and stores the residual, i.e., the error between predicted and observed values. The resulting model tends to fit the data well, because the original data set is used to create the prediction model and then that model is applied to the original data set itself. As a consequence, the residuals are small numbers, having lower variance than the original source data. The residuals with low variance can be efficiently compressed with entropy coding.

The ARIMA-GARCH models can be statistically adapted as described herein to fit the data well, taking into account any trends and heteroscedasticity that the data sequence can have. In this way, higher compression ratios can be achieved.

The ARIMA-GARCH model predicts the next value of a time series, and predicts the future variance intervals as well. The prediction of the variance intervals is useful for the arithmetic coding phase 140 of the compression process 100 of FIG. 1. As arithmetic coding efficiency depends on the distribution of the samples to be compressed, information about the variance can be used to apply arithmetic coding to the residuals in an adaptive way, breaking the sequence of residuals into subsequences where variance is approximately constant. Using this strategy, even higher compression ratios can be obtained, as would be apparent to a person of ordinary skill in the art.

According to another aspect of the invention, the ARIMA-GARCH model allows management of the trade-off between compression ratio and compression time. In order to fit the ARIMA and the GARCH models, the whole dataset 250 need not be processed. Rather, a subset of the dataset 250 might be sufficient. The smaller the subset, the faster the compression process 100, but, on the other hand, the compression ratio tends to be smaller.

Dealing with this trade-off is important to address different compression needs, such as when data needs to be compressed on-the-fly to be transmitted (commonly called inline or inband compression) or when there is no limitation on the compression time and maximum compression ratio can be obtained.

It is important to notice that decompression is efficient regardless of the size of the subset used during the compression.

EXAMPLES

Maximizing Compression

The disclosed method can be applied to compress seismic datasets taking into account the whole datasets to create the ARIMA-GARCH model. In one exemplary implementation, a single model was employed for all traces that were collected for a shot of a synthetic experiment. Traces were recorded by 47 channels (positions where the receivers collect data) and there were 2650 samples per trace. Traces were sequences of values quantized in 16-bit integers, which were concatenated in order to create a single data series. In this particular case, a compression ratio of 1:5.7 was obtained, i.e., the compressed data is almost 6 times smaller than the original data.

It is possible to partition the seismic datasets and create ARIMA-GARCH models for each partition, which tends to increase the accuracy of the ARIMA-GARCH models to fit the data, reducing the residual variance. The ideal size of the partitions depends, however, on the number of parameters of the ARIMA-GARCH models because the values of such parameters also have to be stored.

These strategies to obtain maximum compression, using the whole dataset to create the models, are useful to reduce the cost of storage systems when there is no constraint on the compression time. The data can be analyzed and the best alternative to partition the data and generate ARIMA-GARCH models can be selected.

It is important to notice that, in spite of the fact that the generation of the models can be time-consuming, the decompression time is not affected by an optimized compression ratio.

On-the-Fly Compression

Compression of seismic data can also play an important role to reduce the transmission time of large seismic datasets over distance. If data is already compressed with high compression ratio, transmission time can be substantially reduced. In some use cases, however, seismic data to be transmitted is not yet compressed. If the compression process 100 is started to obtain a very high compression ratio, without any concern about the time to compress the data, the additional time might be greater than the time to send the data through the network without any compression. In order to deal with this situation, a different strategy can be considered.

The most time-consuming task of the seismic data compression process 100 is the generation of the ARIMA-GARCH models (FIG. 4) and the total time heavily depends on the datasets used to fit the models. Instead of using the whole seismic dataset, parts of the dataset can be selected to fit the models and apply the models to larger datasets that the selected portions are related to. If the selected parts represent the larger datasets well, the process speed can be improved while the achieved compression ratio can still be high.

Preprocessing the Generation of Models

Within a scenario in which seismic data is stored within a server, users might want to select just a portion of the data to be downloaded. Of course, the datasets can be partitioned and the partitions can be separately compressed so that they are composed and downloaded according to the selection. With this strategy, however, when the boundaries of the selected parts do not match the boundaries used to partition the data, data may be transmitted that was not selected but was compressed together with selected parts.

An alternative approach would be to pre-generate the models that are the best fit for the possible combinations of selected parts. Instead of storing the compressed data, only the models and the original data can be stored. When it is necessary to download a specific combination, the previously generated model is applied on-the-fly. In this case, the compression is fast, because the most time consuming task will have already been completed.

Combining Compression and Deduplication

Within a scenario in which different (but similar) versions of seismic mega-surveys have to be stored for backup, deduplication of the parts of the data that are changed from one version to the other is an important resource to save space. In this scenario, deduplication should be applied prior to compression. This is viable because the seismic data compression process 100 can be applied to separate data chunks.

It might be the case, however, that the size of the chunks is not optimal for compression by the seismic data compression process 100. The overall benefit of combining compression and deduplication compared to the application of a single optimized compression depends on the size of the data chunks and on how often parts of the seismic mega surveys remain unchanged from one version to the other.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 7:
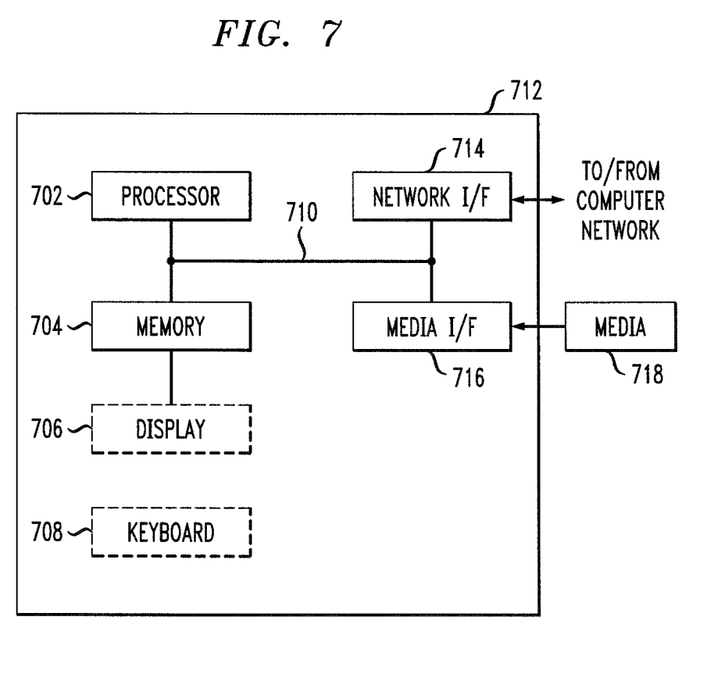
FIG. 7 is a system diagram of an exemplary computer system on which at least one embodiment of the invention can be implemented.

By way of example, an aspect of the present invention can make use of software running on a general purpose computer. FIG. 7 is a system diagram of an exemplary computer system on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from improved compression of seismic data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method for compressing heteroscedastic data, said method comprising:
    obtaining said heteroscedastic data;
    applying said heteroscedastic data to a combined Autoregressive Integrated Moving Average (ARIMA)-Generalized Autoregressive Conditional Heteroscedasticity (GARCH) model, wherein said ARIMA is modified by GARCH predictions to generate heteroscedastic predictions;
    transforming at least a portion of said heteroscedastic data and said heteroscedastic predictions to a reversible format, independently of prior knowledge about possible values of said heteroscedastic data and said heteroscedastic predictions, wherein residuals between said heteroscedastic data and said heteroscedastic predictions have a lower entropy than said heteroscedastic data and wherein said heteroscedastic data is rebuilt substantially without a loss of precision, based on said heteroscedastic predictions and said residuals; and
    compressing parameters of said ARIMA-GARCH model and said residuals using entropy encoding to generate compressed residual data, wherein said compressed residual data is one or more of stored, transmitted and processed.

2. The method of claim 1, wherein said ARIMA-GARCH model models a time series using time-series stochastic models with coefficients that reduce a variance of the residuals.

3. The method of claim 1, wherein said entropy encoding comprises an arithmetic encoding.

4. The method of claim 1, wherein said obtaining step further comprises the step of mapping floating-point numbers to integers.

5. The method of claim 1, further comprising the step of adjusting one or more parameters of the ARIMA-GARCH model to fit said obtained heteroscedastic data.

6. The method of claim 5, further comprising the step of estimating a number of parameters of the ARIMA-GARCH model, wherein a number of terms for an ARIMA portion of said model is based on previous values having an autocorrelation above a certain threshold and wherein a number of terms for a GARCH portion of said model is based on determining whether a number of components fits the variance.

7. The method of claim 5, further comprising the step of estimating values for parameters of the ARIMA-GARCH model.

8. The method of claim 5, wherein said step of adjusting one or more parameters of the ARIMA-GARCH model to fit said obtained heteroscedastic data is based on only a subset of said obtained heteroscedastic data.

9. The method of claim 1, further comprising the step of decompressing said compressed residual data by performing an entropy decoding and obtaining the parameters of said ARIMA-GARCH model and said residuals, and applying the ARIMA-GARCH model created during the compression to predict heteroscedastic data values and then the decompressed residuals are added.

10. The method of claim 1, further comprising the step of partitioning said obtained heteroscedastic data and creating one of said ARIMA-GARCH models for each partition.

11. The method of claim 1, wherein said heteroscedastic data comprises seismic data.

12. The method of claim 1, wherein said ARIMA-GARCH model is generated in advance and obtained from storage for application to said heteroscedastic data.

13. The method of claim 1, further comprising the step of deduplicating said heteroscedastic data before applying said heteroscedastic data to said ARIMA-GARCH model.

14. A computer program product comprising a non-transitory machine-readable storage medium having encoded therein executable code of one or more software programs, wherein the one or more software programs when executed perform the following steps:
    obtaining said heteroscedastic data;
    applying said heteroscedastic data to a combined Autoregressive Integrated Moving Average (ARIMA)-Generalized Autoregressive Conditional Heteroscedasticity (GARCH) model, wherein said ARIMA is modified by GARCH predictions to generate heteroscedastic predictions;
    transforming at least a portion of said heteroscedastic data and said heteroscedastic predictions to a reversible format, independently of prior knowledge about possible values of said heteroscedastic data and said heteroscedastic predictions, wherein residuals between said heteroscedastic data and said heteroscedastic predictions have a lower entropy than said heteroscedastic data and wherein said heteroscedastic data is rebuilt substantially without a loss of precision, based on said heteroscedastic predictions and said residuals; and
    compressing parameters of said ARIMA-GARCH model and said residuals using entropy encoding to generate compressed residual data, wherein said compressed residual data is one or more of stored, transmitted and processed.

15. A system for compressing heteroscedastic data, comprising:
- a memory; and
- at least one hardware device, coupled to the memory, operative to implement the following steps:
- obtain said heteroscedastic data;
- apply said heteroscedastic data to a combined Autoregressive Integrated Moving Average (ARIMA)-Generalized Autoregressive Conditional Heteroscedasticity (GARCH) model, wherein said ARIMA is modified by GARCH predictions to generate heteroscedastic predictions;
- transform at least a portion of said heteroscedastic data and said heteroscedastic predictions to a reversible format, independently of prior knowledge about possible values of said heteroscedastic data and said heteroscedastic predictions, wherein residuals between said heteroscedastic data and said heteroscedastic predictions have a lower entropy than said heteroscedastic data and wherein said heteroscedastic data is rebuilt substantially without a loss of precision, based on said heteroscedastic predictions and said residuals; and
- compress parameters of said ARIMA-GARCH model and said residuals using entropy encoding to generate compressed residual data, wherein said compressed residual data is one or more of stored, transmitted and processed.

16. The system of claim 15, wherein said at least one hardware device is further configured to map floating-point numbers to integers.

17. The system of claim 15, wherein said at least one hardware device is further configured to adjust one or more parameters of the ARIMA-GARCH model to fit said obtained heteroscedastic data.

18. The system of claim 15, wherein said at least one hardware device is further configured to decompress said compressed residual data by performing an entropy decoding and obtaining the parameters of said ARIMA-GARCH model and said residuals, and applying the ARIMA-GARCH model created during the compression to predict heteroscedastic data values and then the decompressed residuals are added.

19. The system of claim 15, wherein said at least one hardware device is further configured to partition said obtained heteroscedastic data and creating one of said ARIMA-GARCH models for each partition.

20. The system of claim 15, wherein said heteroscedastic data comprises seismic data.

21. The system of claim 15, wherein said ARIMA-GARCH model is generated in advance and obtained from storage for application to said heteroscedastic data.

* * * * *